United States Patent [19]

Kurematsu

[11] Patent Number: 5,438,379
[45] Date of Patent: Aug. 1, 1995

[54] IMAGE PROJECTION APPARATUS

[75] Inventor: Katsumi Kurematsu, Atsugi, Japan

[73] Assignee: Canon Kabushiki Kaisha, Tokyo, Japan

[21] Appl. No.: 156,012

[22] Filed: Nov. 23, 1993

[30] Foreign Application Priority Data

Nov. 25, 1992 [JP] Japan .................. 4-315101

[51] Int. Cl.⁶ .............. G03B 21/14; F21V 7/08
[52] U.S. Cl. ...................... 353/98; 353/102; 362/296; 362/308
[58] Field of Search ........... 353/38, 102, 31, 98, 353/122; 359/40, 41, 48, 49; 362/268, 296, 300, 307, 308, 326–327, 336–330

[56] References Cited

U.S. PATENT DOCUMENTS

| | | | |
|---|---|---|---|
| 2,624,234 | 1/1953 | Gretener | 353/98 |
| 3,302,517 | 2/1967 | Henkel | 362/268 |
| 4,171,874 | 10/1979 | Bigelow et al. | 350/345 |
| 4,636,611 | 1/1987 | Penney | 219/124.34 |
| 4,642,740 | 2/1987 | True | 362/308 |
| 4,722,595 | 2/1988 | Shimazaki | 350/336 |
| 4,770,525 | 9/1988 | Umeda et al. | 353/38 |
| 5,192,962 | 3/1993 | Nishida et al. | 353/102 |

FOREIGN PATENT DOCUMENTS

| | | |
|---|---|---|
| 0221680 | 5/1987 | European Pat. Off. . |
| 0228288 | 7/1987 | European Pat. Off. . |
| 0440379 | 7/1991 | European Pat. Off. . |
| 969367 | 3/1958 | Germany . |
| 1026099 | 3/1958 | Germany . |
| 1867642 | 2/1963 | Germany . |
| 2513959 | 10/1975 | Germany . |
| 3319562 | 2/1984 | Germany . |
| 1278233 | 9/1984 | Germany . |
| 2044601 | 2/1990 | Japan . |
| 2103084 | 4/1990 | Japan . |

Primary Examiner—William A. Cuchlinski, Jr.
Assistant Examiner—William C. Dowling
Attorney, Agent, or Firm—Morgan & Finnegan

[57] ABSTRACT

This invention is directed to an image projection apparatus. The apparatus comprises a light source having first and second high-luminance light-emitting portions along an optical axis, a reflecting mirror, arranged behind the light source, for reflecting light beams from the first and second light-emitting portions to direct the light beam from the first light-emitting portion toward a central portion of an image and direct the light from the second light-emitting portion toward a peripheral portion of the image, a projection optical system for projecting the image on a plane, and focusing means, arranged to be adjacent to the image and having a larger focusing effect at a peripheral portion than at a central portion, for causing the light beams from the first and second light-emitting portions to be incident on the projection optical system.

14 Claims, 7 Drawing Sheets

IMAGE PROJECTION APPARATUS

BACKGROUND OF THE INVENTION

1. Field of the Invention

The present invention relates to an image projection apparatus and, more particularly, to an image projection apparatus for projecting an image formed by a liquid crystal panel onto a screen.

2. Related Background Art

FIG. 1 shows a fundamental construction of a liquid crystal projector. As a light source, a metal halide lamp 1 is generally used because of its color rendering property and luminous efficiency. Light emitted from the lamp 1 is reflected by a rotating parabolic reflector 20 to become illuminance light (collimated light) for a liquid crystal light valve 6. A plano-convex condenser lens 30 having a spherical surface is arranged to be adjacent to the liquid crystal light valve 6 and located on the lamp 1 side. The illumination light is focused immediately before the liquid crystal light valve 6 by the lens 30. The light (image light) emerging from the liquid crystal light valve 6 is then focused into the aperture (pupil) of a stop of a projection lens 9 (which is so-called defined as Köhler illumination system).

Since the metal halide lamp 1 is an arc lamp driven by AC power supply having the structure shown in FIG. 2, the lamp has the luminance distribution shown in FIGS. 3A and 3B. FIG. 3A shows an isoilluminance distribution viewed from a direction perpendicular to two electrodes 112 and 112' in the lamp 1. FIG. 3B shows an illuminance distribution (in the direction of the optical axis) on a line segment connecting points a and a' on the electrodes 112 and 112'. As is apparent from FIG. 3B, there are two bright points $a$ and $a'$ separated from each other by a distance substantially equal to the distance between the electrodes 112 and 112' in the direction of the optical axis.

For this reason, in the above-described liquid crystal projector, for example, as shown in FIG. 1, even if the center of the arc of the metal halide lamp 1 is aligned with the focal point of the rotating parabolic reflector 20, some light components from both the bright points $a$ and $a'$ are deviated from predetermined optical paths (a1, a2, and a3) and are not incident on the pupil of the projection lens 9, as indicated by broken lines b1 and b2 with arrow heads. Therefore, these light components cannot be effective image projection light. Even if one of the bright points is aligned with the focal point, since a light beam from the other bright point does not become effective image projection light, the light emitted from the lamp 1 cannot be effectively used.

SUMMARY OF THE INVENTION

It is an object of the present invention to provide an image projection apparatus which can efficiently use the light emitted from a light source.

An image projection apparatus of the present invention comprises a light source having first and second high-luminance light-emitting portions along an optical axis, a reflecting mirror, arranged behind the light source, for reflecting light beams from the first and second light-emitting portions to direct the light beam from the first light-emitting portion toward a central portion of an image and direct the light from the second light-emitting portion toward a peripheral portion of the image, a projection optical system for projecting the image on a plane, and focusing means, arranged to be adjacent to the image and having a larger focusing effect at a peripheral portion than at a central portion, for causing the light beams from the first and second light-emitting portions to be incident on the projection optical system.

For example, the focusing means includes an aspherical lens having a refracting surface whose peripheral portion has a smaller curvature than a center portion, a member having a central portion formed of a flat surface perpendicular to the optical axis, and a peripheral portion formed of a refracting surface inclined with respect to the optical axis, or a Fresnel lens or the like having a central portion formed of a flat surface perpendicular to the optical axis, and a peripheral portion formed of an array of small prisms.

When the focusing means includes either the member or the Fresnel lens mentioned above, for example, the light source is arranged such that the first light-emitting portion is located on the projection optical system side, and the second light-emitting portion is located on the reflecting mirror side. The reflecting mirror is an elliptic mirror, and the first light-emitting portion is located at one of focal points of the elliptic mirror which is closer thereto. A stop of the projection optical system is substantially located at one of the focal points of the elliptic mirror which is farther therefrom. When the focusing means includes the aspherical lens, the light source is arranged such that the first light-emitting portion is located on the projection optical system side, and the second light-emitting portion is located on the reflecting mirror side. The reflecting mirror is a parabolic mirror. The first light-emitting portion is located at the focal point of the first parabolic mirror.

DETAILED DESCRIPTION OF THE PREFERRED EMBODIMENTS

Figure 4:
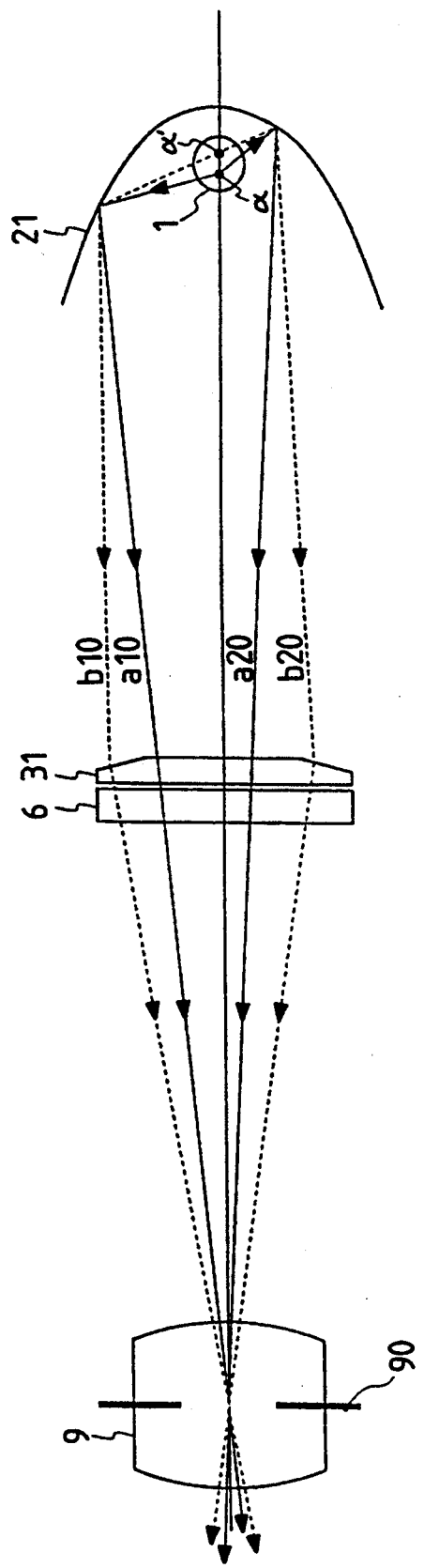
FIG. 4 is a view showing the first embodiment of the present invention.

FIG. 4 shows an image projection apparatus according to the first embodiment of the present invention. Referring to FIG. 4, a rotating elliptic reflector 21 is set such that one bright point a of a metal halide lamp 1 is aligned at one of focal points of the reflector 21, while the aperture center (pupil center) of a stop 90 of a projection lens 9 is aligned with the other one of focal points of the reflector 21. A liquid crystal light valve 6 serves to form an image by modulating incident light. The liquid crystal light valve 6 is located between the metal halide lamp 1 and the projection lens 9. An aspherical condenser lens 31 having a central portion formed of a flat surface and having a power only at its peripheral portion is arranged to be adjacent to the liquid crystal light valve 6 and located on the lamp 1 side.

Since the bright point a of the lamp 1 is aligned at one focal point of the rotating elliptic reflector 21, light beams emitted from the bright point a are reflected by the reflector 21, and then are radiated on only the central portion of the condenser lens 31, as indicated by arrows a10 and a20. Since the central portion of the condenser lens 31 has no power, these light beams are transmitted through the condenser lens 31 without being influenced, and illuminate the liquid crystal light valve 6. The light beams emerging from the liquid crystal light valve 6 are focused on the aperture center, of the stop 90 of the projection lens 9, locating on the other one of focal points of the reflector 21.

On the other hand, since the other bright point a' of the metal halide lamp 1 is located to be slightly closer to the inner side (reflector side) than one focal point (the position of the bright point a) of the reflector 21, light beams emitted from the bright point a' slightly diverge and mainly illuminate the peripheral portion of the condenser lens 31, as indicated by arrows b10 and b20. The refracting surface of the peripheral portion of the condenser lens 31 has a predetermined power. For this reason, when the light beams pass through the condenser lens 31, they are focused and illuminate the peripheral portion of the liquid crystal light valve 6, and pass through the liquid crystal light valve 6 to reach the aperture of the stop 90 of the projection lens 9. These light beams would not be incident on the pupil of the projection lens 9 if the condenser lens 31 is not provided therewith.

With this arrangement, light beams from one of bright points in the metal halide lamp 1 can be used as illuminance light in the central portion of the liquid crystal light valve 6, while light beams from the other one of the bright points can be mainly used as illumination light for the peripheral portion of the liquid crystal light valve 6. Therefore, the utilization efficiency of light emitted from the lamp 1 is greatly improved.

Figure 5:
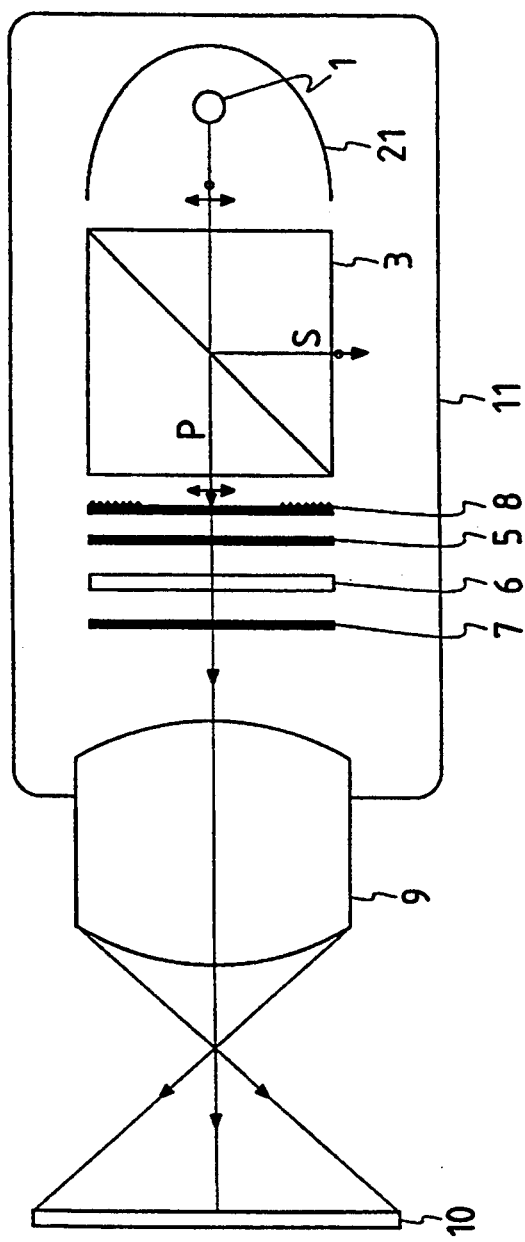
FIG. 5 is a view showing the second embodiment of the present invention.

FIG. 5 shows the second embodiment in which the image projection apparatus of the present invention is applied to a single-plate type liquid crystal projector. Referring to FIG. 5, a polarizing beam splitter 3 removes unnecessary polarized light components of light emitted from a metal halide lamp 1. Polarizing plates 5 and 7 serve to form an image in cooperation with a liquid crystal light valve 6. A Fresnel lens 8 has a central portion formed of a flat surface. A prism portion is formed only on a peripheral portion of the Fresnel lens 8. Similar to the condenser lens 31, the Fresnel lens 8 has a power only at its peripheral portion. The lamp 1, a reflector 21, and the lens 8 are arranged in the same manner as in the first embodiment. Therefore, a single-plate type liquid crystal projector having high utilization efficiency can be realized. In addition, since the Fresnel condenser lens 8 has a sheet-like form, a simpler structure can be easily realized by integrating the lens 8 and the polarizing plate 5.

Figure 6:
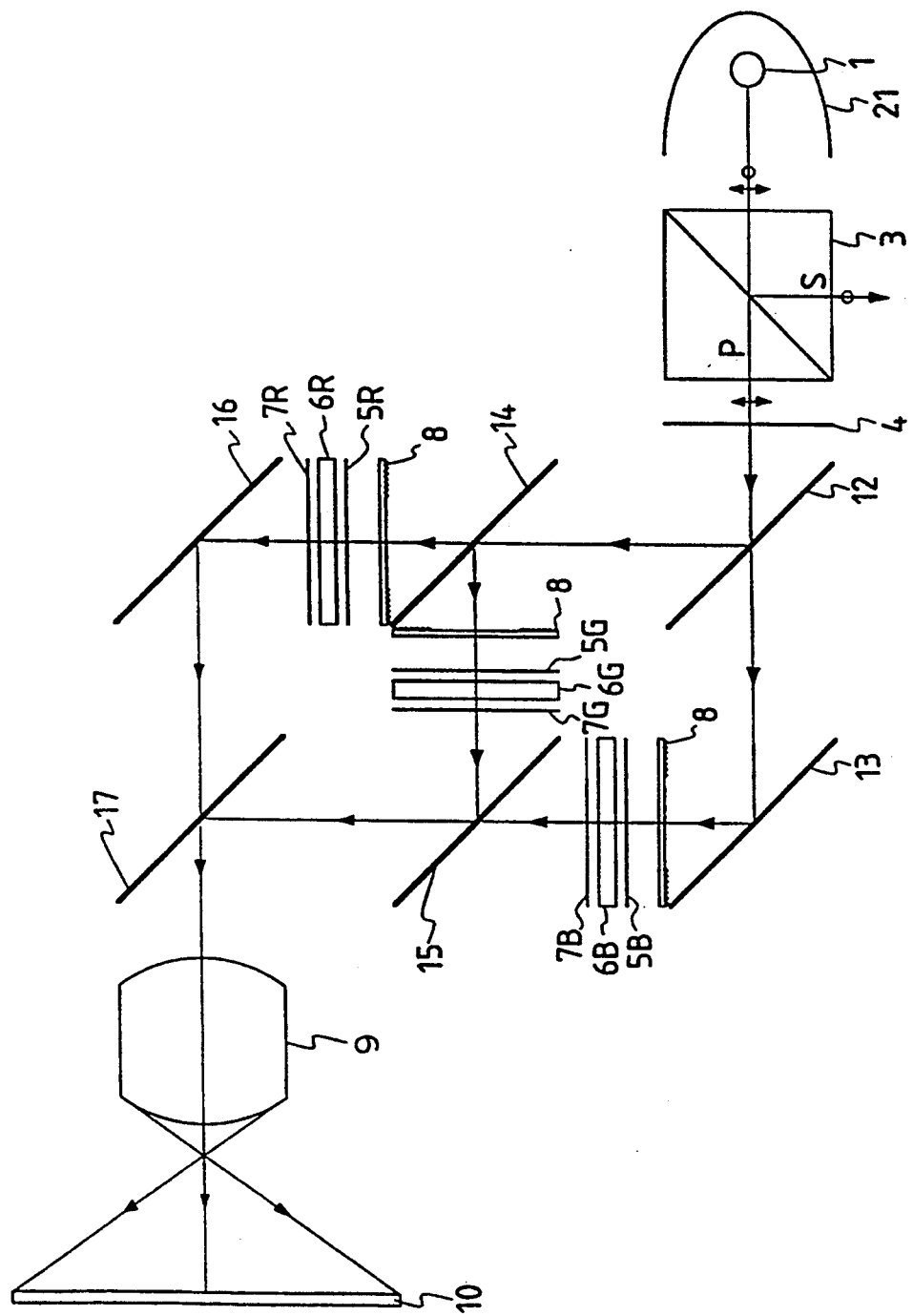
FIG. 6 is a view showing the third embodiment of the present invention.

FIG. 6 shows the third embodiment in which the image projection apparatus of the present invention is applied to a three-plate type liquid crystal projector. Referring to FIG. 6, dichroic mirrors 12, 14, 15, and 17 serve to perform color separation and color synthesis of a light beam from a metal halide lamp 1. The projector includes reflecting mirrors 13 and 16. Fresnel condenser lenses 8, each having a power only at its peripheral portion, are respectively arranged, in the same manner as in the second embodiment, behind (on the light source side) liquid crystal light valves 6R, G, and 6B for forming color images by using light beams of the respective colors. An illumination optical system having the same function as that in the first embodiment is formed in each optical path of light of each color. Therefore, in the three-plate type liquid crystal projector, a liquid crystal projector having high utilization efficiency of light can be realized.

The condenser lens 31 used in the apparatus shown in FIG. 4 may be substituted for the fresnel condenser lens 8 used in the apparatuses shown in FIGS. 5 and 6.

Figure 7:
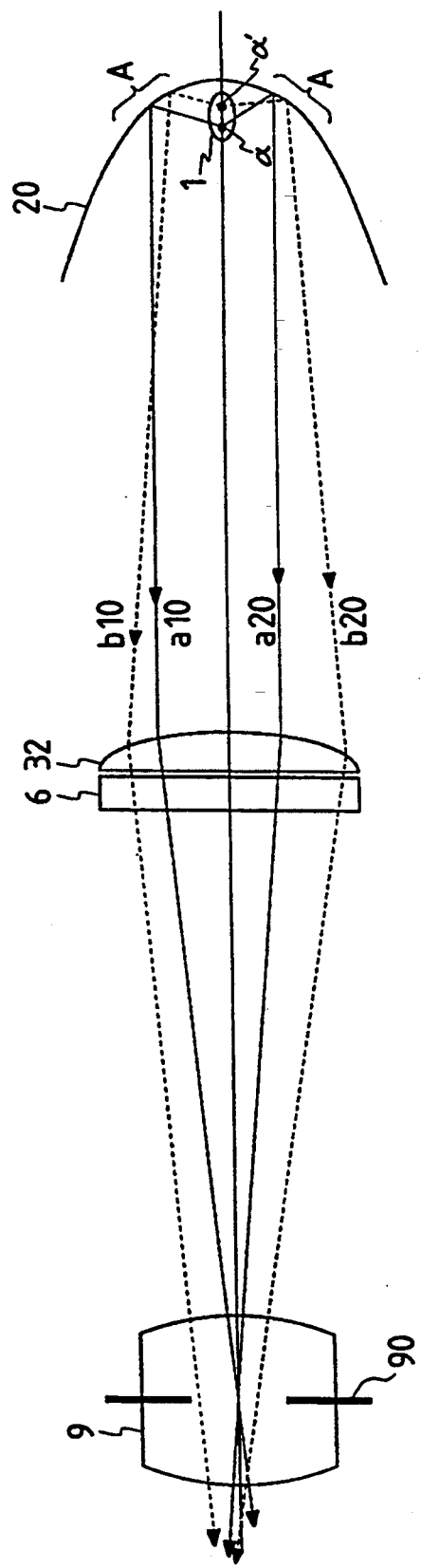
FIG. 7 is a view showing the fourth embodiment of the present invention.

FIG. 7 shows an image projection apparatus according to the fourth embodiment of the present invention. The same reference numerals in FIG. 7 denote the same members as in FIG. 4.

Figure 1:
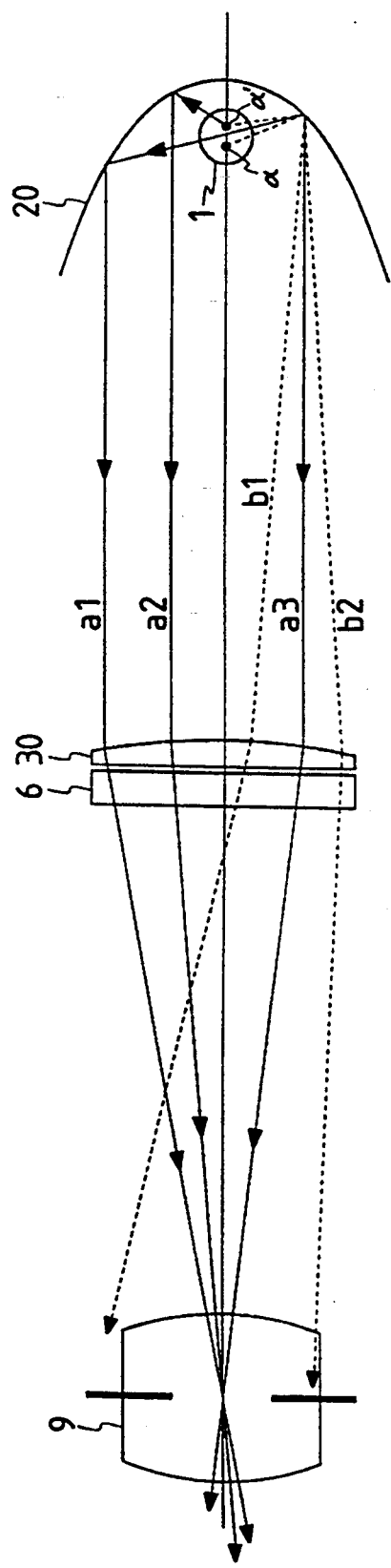
FIG. 1 is a view showing a conventional image projection apparatus.
Figure 2:
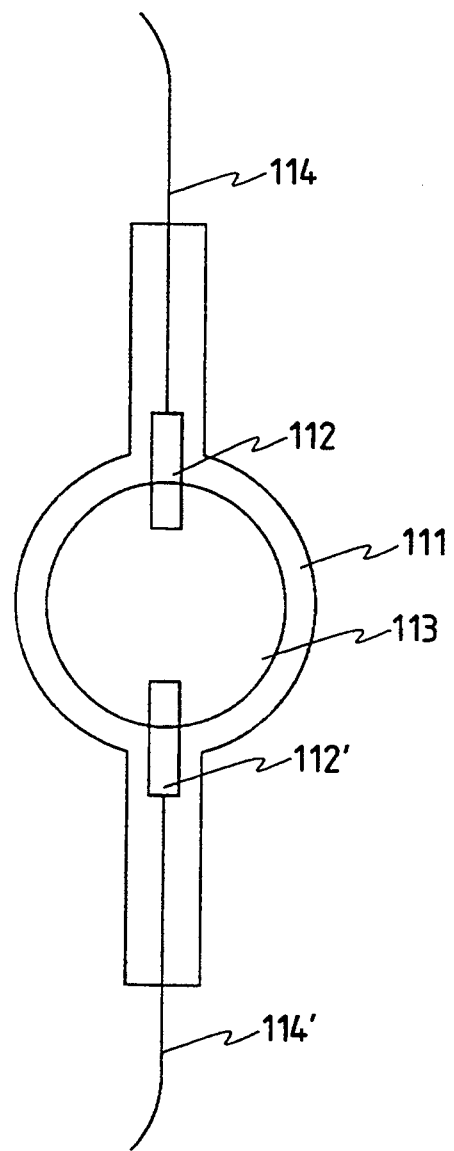
FIG. 2 is a view showing the structure of a metal halide lamp 1 in FIG. 1.
Figure 3A:
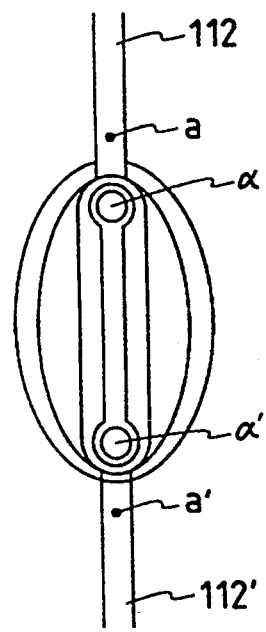
FIGS. 3A and 3B are charts showing a luminance distribution formed along a pair of electrodes of the metal halide lamp 1 in FIG. 1.
Figure 3B:
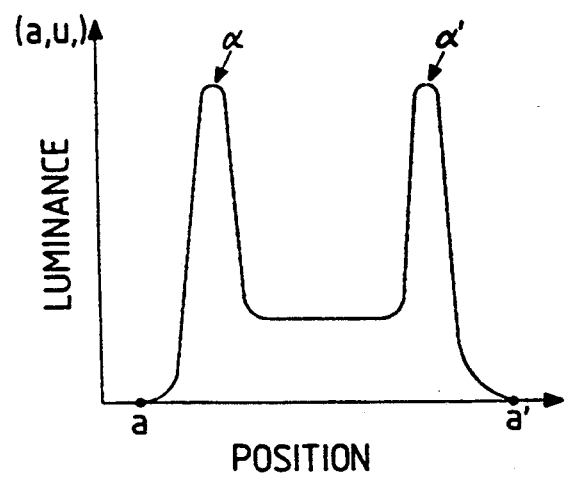

The apparatus includes a discharge-type light source constituted by a metal halide lamp 1, a reflector 20 having a parabolic surface, and an aspherical condenser lens 32. A central portion of the lens 32 has almost the same power (1/f: f=focal length) as that of the condenser lens 30 in FIG. 1, whereas a peripheral portion of the lens 32 has a larger power than the central portion. One of bright points of the lamp 1, namely a is aligned with one focal point of the parabolic reflector 20.

Note that an area A on which the maximum amount of light from the lamp 1 is radiated. Light beams emitted from the bright point a of the lamp 1 are converted into substantial collimated light beams a10 and a20 by the reflector 20 and are focused into the aperture of a stop 90 of a projection lens 9 by the condenser lens 32.

Since the other one of bright points of the lamp 1, namely a' is located to be slightly closer to the inner side (reflector side) than one focal point of the reflector 20, light beams emitted from the bright point a' become light beams b10 and b20 which slightly diverge and reach the peripheral portion of the condenser lens 32. The light beams b10 and b20 are then focused by the large focusing power of the peripheral portion of the condenser lens 32 to pass through the aperture of the stop 90 of the projection lens 9.

In this manner, the light beams, which slightly diverge and illuminate the peripheral portion of the liquid crystal light valve 6 and which have not been able to reach the aperture of the stop 90 of the projection lens 9 without the condenser lens 32, can be focused into the aperture of the stop 90. Therefore, the amount of light at a peripheral portion of an image projected on a screen can be increased.

The present invention is not limited to the above-described embodiments, and various modifications can be made without departing from the spirit and scope of the invention. For example, the present invention can be applied to an apparatus in which at least some of light beams from an illumination system are not collimated, and the noncollimated light beams illuminate a peripheral portion of an object to be illuminated. As a condenser lens used in the present invention, any condenser lens having a larger focusing power at a peripheral portion than at a central portion may be used, and the central portion may or may not have a power. If, however, the reflector has an elliptic reflecting surface, and the reflecting surface itself has a strong focusing effect, the central portion of the condenser lens need not have a power. In addition, one bright point a of the light source may be located at the focal point of the reflector, while the other bright point a' may be located on the opposite side (image side) to the reflector. In any cases, the two bright points of the light source are preferably arranged on the optical axis of the reflector.

In each embodiment described above, each of the condenser lenses 8, 31, and 32 is arranged to be adjacent to the liquid crystal light valve 6 and located on the lamp 1 side. However, each condenser lens may be arranged on the projection lens 9 side, or may be arranged to be closer to the lamp 1 when the divergence angle of off-axis divergent light which does not propagate into the aperture of the stop 90 of the projection lens 9 is large.

As has been described above, according to the present invention, light illuminating a peripheral portion of an object to be illuminated can be efficiently guided to a pupil of a projection optical system. In addition, by applying the present invention to a liquid crystal projector, especially the luminance of a peripheral portion of an image projected on the screen can be increased.

What is claimed is:

1. An image projection apparatus comprising:
   a light source having first and second high-luminance light emitting portions;
   a concave mirror having at least one focal point, for reflecting light from said light source toward an object;
   a projection optical system for projecting an image of the object onto a plane; and
   focusing means for focusing the light from said light source into said projection optical system,
   wherein said first and second high luminance light emitting portions are provided along an optical axis of said projection optical system,
   wherein said first high luminance light emitting portion is located on said projection optical system side and said second high luminance light emitting portion is located on said concave mirror side,
   wherein said first high luminance light emitting portion is substantially disposed on the focal point of said concave mirror so that the light from said first high luminance light emitting portion illuminates a central portion of said object and the light from said second high luminance light emitting portion illuminates a peripheral portion of said object, and
   wherein said focusing means is disposed near said object and is so constructed that a focusing effect at a peripheral portion thereof is larger than that at a central portion thereof.

2. An apparatus according to claim 1, wherein said focusing means comprises an aspherical lens, wherein said aspherical lens has a refracting surface whose peripheral portion has a larger curvature than a central portion thereof.

3. An apparatus according to claim 1, wherein said focusing means includes a member having a central portion formed of a flat surface perpendicular to said optical axis, and a peripheral portion formed of a refracting surface inclined with respect to said optical axis.

4. An apparatus according to claim 1, wherein said focusing means includes a Fresnel lens having a central portion formed of a flat surface perpendicular to the optical axis, and a peripheral portion formed of an array of small prisms.

5. An apparatus according to claim 1, wherein said light source is arranged such that the first light-emitting portion is located on the projection optical system side, the second light-emitting portion is located on the reflecting mirror side, said reflecting mirror is an elliptic mirror, and the first light-emitting portion is located at one of focal points of said elliptic mirror which is closer thereto.

6. An apparatus according to claim 3, wherein said light source is arranged such that the first light-emitting portion is located on the projection optical system side, the second light-emitting portion is located on the reflecting mirror side, said reflecting mirror is an elliptic mirror, and the first light-emitting portion is located at one of focal points of said elliptic mirror which is closer thereto.

7. An apparatus according to claim 4, wherein said light source is arranged such that the first light-emitting portion is located on the projection optical system side, the second light-emitting portion is located on the reflecting mirror side, said reflecting mirror is an elliptic mirror, and the first light-emitting portion is located at one of focal points of said elliptic mirror which is closer thereto.

8. An apparatus according to claim 7, wherein a stop of said projection optical system is substantially located at one of the focal points of said elliptic mirror which is farther therefrom.

9. An apparatus according to claim 1, wherein said light source is arranged such that the first light-emitting portion is located on the projection optical system side, the second light-emitting portion is located on the reflecting mirror side, said reflecting mirror is a parabolic mirror, and the first light-emitting portion is located at a focal point of said first parabolic mirror.

10. An apparatus according to claim 2, wherein said light source is arranged such that the first light-emitting portion is located on the projection optical system side, the second light-emitting portion is located on the reflecting mirror side, said reflecting mirror is a parabolic mirror, and the first light-emitting portion is located at a focal point of said first parabolic mirror.

11. An apparatus according to claim 1, wherein said focusing means is disposed between said light source and said image.

12. An apparatus according to claim 1, wherein said focusing means is disposed between said image and said light source.

13. An apparatus according to claim 1, further comprising a liquid crystal panel for forming the image.

14. An image projection apparatus comprising:
    a light source having first and second high-luminance light emitting portions along an optical axis;
    a reflecting mirror, arranged behind said light source, for reflecting light beams from the first and second light-emitting portions to direct the light beam from the first light-emitting portion toward a central portion of an image and direct the light from the second light-emitting portion toward a peripheral portion of the image;
    a projection optical system for projecting said image on a plane; and
    focusing means, arranged to be adjacent to said image and having a larger focusing effect at a peripheral portion than at a central portion, for causing the light beams from the first and second light-emitting portions to be incident on said projection optical system,
    wherein said light source is arranged such that the first light-emitting portion is located on the projection optical system side, the second light-emitting portion is located on the reflecting mirror side, said reflecting mirror is an elliptic mirror, and the first light-emitting portion is located at one of focal points of said elliptic mirror which is closer thereto, and
    wherein a stop of said projection optical system is substantially located at one of the focal points of said elliptic mirror which is farther therefrom.

* * * * *